United States Patent
Smith

(10) Patent No.: US 10,185,568 B2
(45) Date of Patent: Jan. 22, 2019

(54) ANNOTATION LOGIC FOR DYNAMIC INSTRUCTION LOOKAHEAD DISTANCE DETERMINATION

(71) Applicant: Microsoft Technology Licensing, LLC, Redmond, WA (US)

(72) Inventor: Burton J. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 15/136,123

(22) Filed: Apr. 22, 2016

(65) Prior Publication Data

US 2017/0308384 A1    Oct. 26, 2017

(51) Int. Cl.
| | |
|---|---|
| *G06F 9/38* | (2018.01) |
| *G06F 9/30* | (2018.01) |
| *G06F 12/08* | (2016.01) |
| *G06F 12/0875* | (2016.01) |

(52) U.S. Cl.
CPC .............. *G06F 9/3808* (2013.01); *G06F 9/38* (2013.01); *G06F 9/3812* (2013.01); *G06F 9/3836* (2013.01); *G06F 9/3838* (2013.01); *G06F 9/3851* (2013.01); *G06F 9/3855* (2013.01); *G06F 12/0875* (2013.01); *G06F 9/3016* (2013.01); *G06F 2212/452* (2013.01)

(58) Field of Classification Search
CPC .... G06F 9/3836; G06F 9/3838; G06F 9/3812; G06F 9/38; G06F 9/3855
See application file for complete search history.

(56) References Cited

U.S. PATENT DOCUMENTS

| | | | | |
|---|---|---|---|---|
| 5,710,912 A | * | 1/1998 | Schlansker | G06F 9/3836 712/207 |
| 5,941,983 A | | 8/1999 | Gupta et al. | |
| 5,996,064 A | | 11/1999 | Zaidi et al. | |
| 6,311,266 B1 | | 10/2001 | Smith et al. | |
| 6,430,676 B1 | * | 8/2002 | Koblenz | G06F 8/4451 712/207 |
| 6,430,683 B1 | * | 8/2002 | Arimilli | G06F 9/30043 710/117 |
| 6,598,122 B2 | * | 7/2003 | Mukherjee | G06F 9/383 711/126 |
| 7,093,106 B2 | | 8/2006 | Ambekar et al. | |

(Continued)

OTHER PUBLICATIONS

Forsell, Martti, "Implementation of Instruction-Level and Thread-Level Parallelism in Computers", In Dissertation of University of Joensuu, Oct. 10, 1997, 135 pages.

(Continued)

*Primary Examiner* — Yuqing Xiao
(74) *Attorney, Agent, or Firm* — Ranjeev Singh; Singh Law, PLLC

(57) ABSTRACT

A processor having an instruction cache for storing a plurality of instructions is provided. The processor further includes annotation logic configured to determine a lookahead distance associated with an instruction and annotate the at least one instruction cache with the lookahead distance. The lookahead distance may correspond to a number of instructions that separates an instruction that references a register from the most recent register definition. The lookahead distance may indicate the shortest distance to a later instruction that references a register that this instruction defines.

20 Claims, 5 Drawing Sheets

(56) References Cited

U.S. PATENT DOCUMENTS

| | | |
|---|---|---|
| 8,918,626 B2 | 12/2014 | Chou et al. |
| 9,405,548 B2* | 8/2016 | Indukuru .............. G06F 9/3853 |
| 2002/0124162 A1 | 9/2002 | Yung et al. |
| 2006/0212678 A1 | 9/2006 | De Oliveira Kastrup Pereira |
| 2007/0030280 A1 | 2/2007 | Paltashev et al. |
| 2011/0161616 A1 | 6/2011 | Tarjan et al. |
| 2012/0023314 A1* | 1/2012 | Crum .................... G06F 9/3826 |
| | | 712/214 |
| 2013/0086363 A1 | 4/2013 | Gschwind et al. |
| 2014/0181476 A1 | 6/2014 | Srinivasan et al. |
| 2014/0281404 A1 | 9/2014 | Iyengar et al. |

OTHER PUBLICATIONS

Butera, Jeffrey, "Simultaneous Multithreading: Exploiting Instruction-Level and Thread-Level Parallelism in Microprocessors", In Senior Thesis of Haverford College, Apr. 25, 2011, pp. 1-21.

Modi, et al., "FLAP: Flow Look-Ahead Prefetcher", In ELEC 525 Final Report of Rice University, Retrieved on: Jan. 13, 2016, pp. 1-9.

Alverson, et al., "The Tera Computer System", ACM, 1990, 6 pages.

"ARM Architecture Reference Manual for ARMv8", ARM, 2013-15, 5778 pages.

Thistle, et al., "A Processor Architecture for Horizon", IEEE, 1998, 7 pages.

"International Search Report and Written Opinion Issued in PCT Application No. PCT/US2017/027842", dated Sep. 29, 2017, 13 Pages.

\* cited by examiner

ANNOTATION LOGIC FOR DYNAMIC INSTRUCTION LOOKAHEAD DISTANCE DETERMINATION

BACKGROUND

A multi-threaded processor may fetch the instructions belonging to a thread and execute them. While executing instructions for a thread, the processor may execute an instruction that generates a reference to a memory location. Because of the delay associated with the access to the referenced memory location, the processor may have to wait until the referenced memory location is accessed. Similarly, if an instruction takes multiple cycles to execute, a subsequent instruction that depends on it, will have to wait. In order to maintain efficiency, the processor may fetch instructions from a different thread and start executing them. This way, the processor may execute instructions more efficiently. This type of parallelism may be referred to as thread level parallelism. Another way to improve performance is to obtain instruction level parallelism.

Instruction level parallelism may include determining the dependences of the instructions in a thread and issuing the instructions that are independent. The processor may speculatively try to predict dependences and execute the instructions in the thread based on that. Such predictions may turn out to be inaccurate resulting in the processor having to discard the results of the incorrectly predicted dependences of the instructions and re-execute the instructions in the correct order.

SUMMARY

In one example, the present disclosure relates to a processor having an instruction cache for storing a plurality of instructions. The processor may further include annotation logic configured to determine a lookahead distance associated with an instruction and annotate the at least one instruction cache with the lookahead distance.

In another aspect, the present disclosure relates to a processor having an instruction cache for storing a plurality of instructions. The processor may further include annotation logic configured to determine a lookahead distance associated with an instruction and annotate the at least one instruction cache with the lookahead distance. The processor may further include instruction issue logic configured to issue a ready signal for the instruction based on at least the lookahead distance for the instruction, where the lookahead distance provides a measure of register dependence.

In yet another aspect, the present disclosure relates to a method in a processor comprising an instruction cache for storing a plurality of instructions and annotation logic. The method may include using the annotation logic determining a lookahead distance associated with an instruction and annotating the at least one instruction cache with the lookahead distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
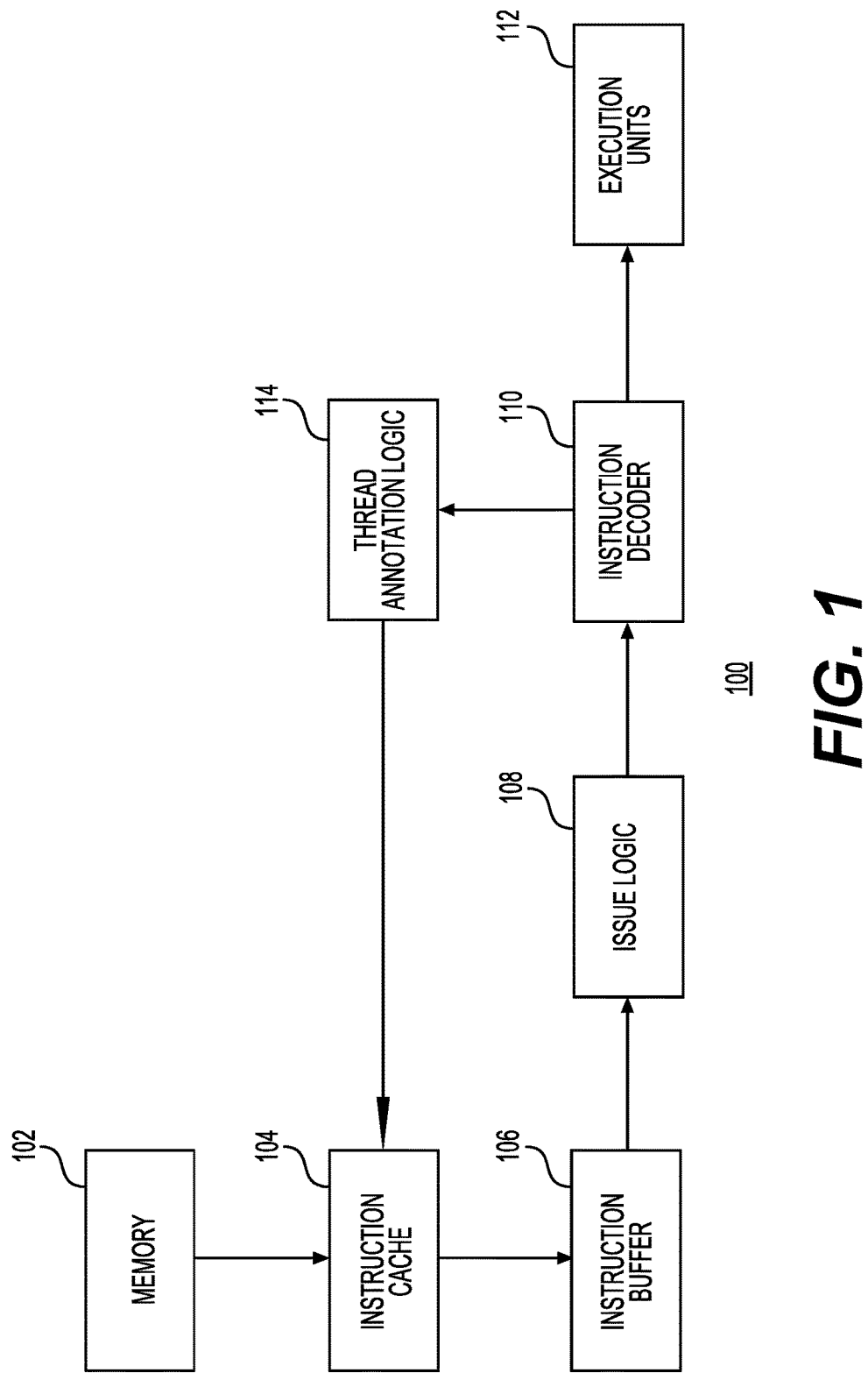
FIG. 1 is a block diagram of a processor in accordance with one example.

Examples described in this disclosure relate to processors that may overlap execution of instructions that may be part of different threads. Thus, the processor may fetch the instructions belonging to a thread, in order, and execute them. While executing instructions for a thread, the processor may execute an instruction that generates a reference to a memory location. That may mean that the processor may have to wait until the referenced memory location is accessed. Similarly, if an instruction takes multiple cycles to execute, a subsequent instruction that depends on it will have to wait. In order to maintain efficiency, the processor may fetch instructions from a different thread and start executing them. This way, the processor may execute instructions more efficiently. This type of parallelism may be referred to as thread level parallelism. Another way to improve performance is to obtain instruction level parallelism.

Instruction level parallelism may be achieved via explicit dependence lookahead. Instructions within a thread may issue in order. An instruction may issue only when its lookahead predecessors have retired and its other predecessors have issued. Each instruction is annotated with a field that has the lookahead distance for that instruction. The lookahead distance may correspond to a number of instructions that separates an instruction that references a register from the most recent register definition. A register is defined as any hardware that holds architectural state. The lookahead distance may indicate the shortest distance to a later instruction that references a register that this instruction defines. In this example, the earlier instruction is a lookahead predecessor of the later instruction. The maximum lookahead distance depends on how it is encoded. As a result of these requirements, all dependences will be enforced. Anti-dependences are enforced simply by requiring instructions to issue in order. Flow and output dependences are enforced by the lookahead. As a consequence, if an instruction C depends on another instruction A, then either instruction A is a lookahead predecessor of instruction C or there is at least one instruction B between instructions A and C, such that instruction A is a lookahead predecessor of instruction B and instruction B is an in-order predecessor of instruction C. Thus, in one example, lookahead is used as follows. First, instructions from each thread are issued in program order, thus enforcing all anti-dependences. Second, a hardware thread is allowed to issue an instruction only if all of its lookahead predecessors have retired and all of its program-order predecessors have issued (i.e. the in-order requirement). These constraints transitively guarantee enforcement of flow and output dependences.

Conditional branch instructions may be handled by annotating a conditional branch as often or seldom. In one example, the lookahead field of a branch instruction may be annotated to specify whether the lookahead should occur only along the branch-taken path (i.e., often) or the not-taken path (i.e., seldom) and lookahead terminated otherwise. As another example, the "often" variant might be used for backwards branches assuming they implement loops, and the "seldom" variant might be used for forward branches assuming out-of-line processing of relatively rare special cases. Hardware branch prediction could also be used to better inform such decisions. Another type of branch may allow lookahead along both paths and the lookahead field may be annotated with the shortest distance from each definition along all branch paths. Unconditional branches with constant targets may continue looking ahead, but procedure returns and other variable-target branches may terminate lookahead to avoid annotating the called procedure with distances not appropriate for other callers, for example. Lookahead across procedure calls may need inter-procedural dependence information.

In addition, memory operations must be ordered and performed consistently with the synchronization model. For example, if release consistency is used, a release must await completion of all memory operations preceding it, and acquires must complete before any succeeding memory operations. In certain architectures, such as ARMv8, synchronization instructions have appropriate semantics to be used in this way. In one example, lookahead annotations could be applied only to currently unannotated memory reference predecessors of a release but it may be more expedient to let release instructions simply stop lookahead. An acquire may be more easily handled by making the nearest following memory reference depend on it.

To further illustrate, an example program fragment that performs a matrix-vector multiply and computes the hyperbolic tangent of the elements of the result is shown in Table 1 below:

```
float a[ ][ ], y[ ], x[ ];
for (int i = 0; i < m; i++) {
   float t = 0.0;
   for (int j = 0; j < n; j++) {
      t += a[i][j]*x[j];
   }
   float e = exp(t);
   float f = 1/e;
   float y[i] = (e == 0.0) ? −1.0 :
                (f == 0.0) ?  1.0 :
                (e − f)/(e + f);
}
```

An example version of this fragment in ARMv8 assembly language, annotated for its dependences, is shown in Table 2 below. The lookahead column records the minimum number of instruction issues in program order between a register definition and its closest following use (flow dependence) or redefinition (output dependence). Flow dependence may be when an instruction is passing a value via a register to another instruction. Output dependence may be when an instruction defines a register and later another instruction defines the same register. An L-bit field can encode distances between 0 and $2^L-1$; larger distances can safely use the largest value. In the table below, CF are the control flag bits.

| PC | Label | Instruction | Definitions | Uses | Lookahead |
|----|-------|-------------|-------------|------|-----------|
| 0  |       | MOV X19, #<m>      | X19      | —         | 11     |
| 1  |       | MOV X21, #<a>      | X21      | —         | 5      |
| 2  |       | MOV X23, #<y>      | X23      | —         | 9      |
| 3  |       | FMOV S8, #1.0      | S8       | —         | 8      |
| 4  | iloop: | MOV X20, #<n>     | X20      | —         | 5      |
| 5  |       | MOV X22, #<x>      | X22      | —         | 2      |
| 6  |       | FMOV S0, #0.0      | S0       | —         | 2      |
| 7  | jloop: | LDR S1, [X21], #4 | S1, X21  | X21       | 1      |
| 8  |       | LDR S2, [X22], #4  | S2, X22  | X22       | 0      |
| 9  |       | FMADD S0, S0, S1, S2 | S0     | S0, S1, S2 | 4     |
| 10 |       | SUBS X20, X20, #1  | X20, CF  | X20       | 0      |
| 11 |       | B.GE jloop         | —        | CF        | often  |
| 12 |       | BL exp             | X30      | —         | never  |
| 13 |       | FDIV S3, S8, S0    | S3, FS   | S0, S8    | 3      |
| 14 |       | FCMP S0, #0.0      | CF       | S0        | 1      |
| 15 |       | FMOV S1, #−1.0     | S1       | —         | 2      |
| 16 |       | B.EQ store         | —        | CF        | seldom |
| 17 |       | FCMP S3, #0.0      | CF       | S3        | 1      |
| 18 |       | FMOV S1, #1.0      | S1       | —         | 1      |
| 19 |       | B.EQ store         | —        | CF        | seldom |
| 20 |       | FSUB S1, S0, S3    | S1       | S0, S3    | 1      |
| 21 |       | FADD S2, S0, S3    | S2       | S0, S3    | 0      |
| 22 |       | FDIV S1, S1, S2    | S1       | S1, S2    | 0      |
| 23 | store: | STR S1, [X23], #4 | X23      | X23, S1   | 10     |
| 24 |       | SUBS X19, X19, #1  | X19, CF  | X19       | 0      |
| 25 |       | B.GE iloop         | —        | CF        | often  |

FIG. 1 is a block diagram of a portion of a multithreaded processor 100 in accordance with one example of the present disclosure. Processor 100 may include a memory 102, an instruction cache 104, an instruction buffer 106, an issue logic 108, an instruction decoder 110, execution units 112, and thread annotation logic 114. In this example, memory 102 may supply instructions via instruction cache 104 to instruction buffer 106. Instructions may correspond to any one of multiple threads being processed by processor 100. Issue logic 108 may select instructions for instruction decoder 110 and instruction execution. Execution units 112 may perform various operations, including add, branch and other operations. As explained later, issue logic 110 may provide for instruction level parallelism via explicit dependence lookahead. Instructions within a thread issue in order. An instruction may issue only when its lookahead predecessors have retired and its in-order predecessor has issued. Although FIG. 1 shows a certain number of components of processor 100 arranged in a certain manner, there could be more or fewer number of components arranged differently. As an example, processor 100 may include register files, a data cache, program counters, a branch predictor, and other hardware resources.

Figure 2:
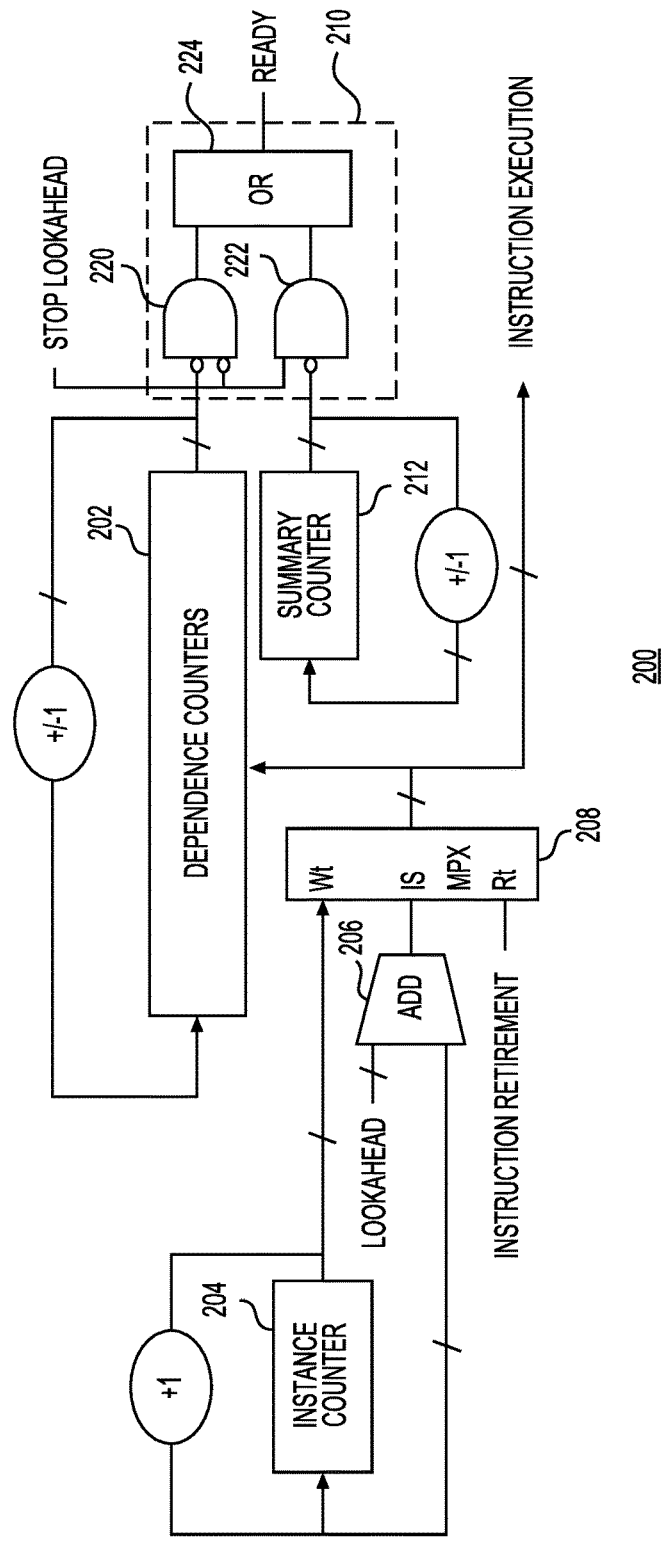
FIG. 2 is a block diagram of a portion of the instruction issue logic for a processor in accordance with one example.

FIG. 2 is a block diagram of a portion of the per thread instruction issue logic 200 for executing instructions by a processor 100 in accordance with one example. In one example, instruction issue logic 200 generates a ready signal for a thread for execution by processor 200. In this example, instruction issue logic may include dependence counters 202, an instance counter 204, an adder 206, a multiplexer 208, a ready signal generator 210, and a summary counter 212. The example of FIG. 2 is explained with the assumption that the maximum lookahead distance is 16 and thus the lookahead field may be 4 bits (L bits) wide. The lookahead field supplies the processor hardware with an upper bound on the number of additional instructions that may begin execution before the current instruction is completed. Thus, for example, if the lookahead value is zero for a program, then the processor may finish each instruction in order before starting the next one. A rotating priority encoder (not shown) or another priority mechanism may be used to select an instruction from those threads with ready instructions in some order. The instructions may issue only when all dependences are satisfied. This may advantageously result in the instructions not having to be issued to determine whether there are any dependences. At any time or instance, in this example, up to sixteen instructions may be executing from each thread. The dependence counter in this example will tell for how many reasons an instruction is waiting. In this example, dependence counters 202 may be implemented as an array of dependence counters (Dc[ ]) using a small memory. Each thread may have an associated instance counter 204 (e.g., an L-bit instance counter) to label its instruction. For example, if the maximum lookahead is 16 instructions, then instance counter 204 may count from 0 to 15. When an instruction with a lookahead annotation La is issued, the instance counter is incremented by 1 modulo L, and the associated dependence counter, which is determined by $Dc[(Ic+La) \mod 2^L]$, is incremented by 1. The associated dependence counter is decremented when an instruction instance that incremented the dependence counter retires (e.g., completes execution). In one example, a thread is ready to issue its next instruction when the dependence counter associated with the thread's next instruction is zero. When multiple threads have instruction instances that could be issued, a priority mechanism, such as a rotating priority encoder, may select a thread's instruction for execution from those threads with ready instructions. In this example, the associated dependence counter is indexed by an index value, which is calculated using adder 206. Adder 206 receives the instance counter value and the lookahead value for the instruction corresponding to the instance counter and computes the index to the dependence counter that will be incremented. As noted earlier, the value of the index provided to input Is of multiplexer 208 corresponds to $Dc[(Ic+La) \mod 2^L]$.

In this example, the output of dependence counters is coupled to a ready signal generator 210. Ready signal generator may include logic, including gates 220, 222, and 224. With respect to gate 220, a logic 1 signal is output when both inputs are zero. Thus, a ready signal for an instruction instance is issued when the corresponding dependence counter value is zero and the stop lookahead signal is not asserted (e.g., it has a logic 0 value). The output of logic gate 220, in turn, generates the ready signal after passing through OR gate 224. As discussed earlier, when the instruction for which the ready signal is issued has retired, it asserts the instruction retirement signal at input Rt of multiplexer 208. When the output of multiplexer 208 is passed to the dependence counter associated with the retiring instruction, the dependence counter is decremented. Multiplexer 208 has a third input, labeled as Wt, which is coupled to receive the value of the instance counter. This input is used to wait on the decrement counter to go to zero for the current instruction instance. When the thread is not in process of issuing or retiring instructions, the value of the instance counter is coupled, to dependence counters 202, via input Wt of multiplexer 208.

In this example, with the lookahead field being L bits, the maximum dependence counter value due to lookahead is $2^L$, which does not quite fit into L bits. Also, still larger values may occur if this machinery is used to make instruction instances wait for other events, such as branch address computations or instruction cache fills. Thus, a dependence counter array ([Dc]) may be implemented as a $2^L$ by L+1 bit memory. In one example, such an array may have one read port and one write port. Port contention may not be a serious issue if the number of active threads is reasonably large because the cycle following a successful issue is unlikely to select the same thread. This means the lookahead-based incrementing of a location in dependence counters (Dc) 202 may steal the read and write ports for a cycle or two with little performance impact. The instruction retirement events that decrement locations in Dc will occur irregularly and could be queued per thread and allowed to steal cycles opportunistically, e.g., only if Dc[Ic] is nonzero.

Referring still to FIG. 2, summary counter (Sc) 212 is used in a situation when lookahead is stopped. The stop lookahead input to ready signal generator 210 is generated from the thread's next instruction in the instruction buffer 106. A summary counter 212, per thread, is configured to remember the total dependence count. Summary counter (Sc) 212 is incremented at every instruction issue and decremented at every instruction retirement so that when it is zero all preceding instructions have completed. An instruction waiting for this condition will feed the zero condition of summary counter (Sc) 212 rather than that of Dc[Ic] to the ready output of ready signal generator 210 to indicate readiness to issue. The ready signal is generated when stop lookahead is asserted (logic 1) and summary counter (Sc) is zero.

Figure 3:
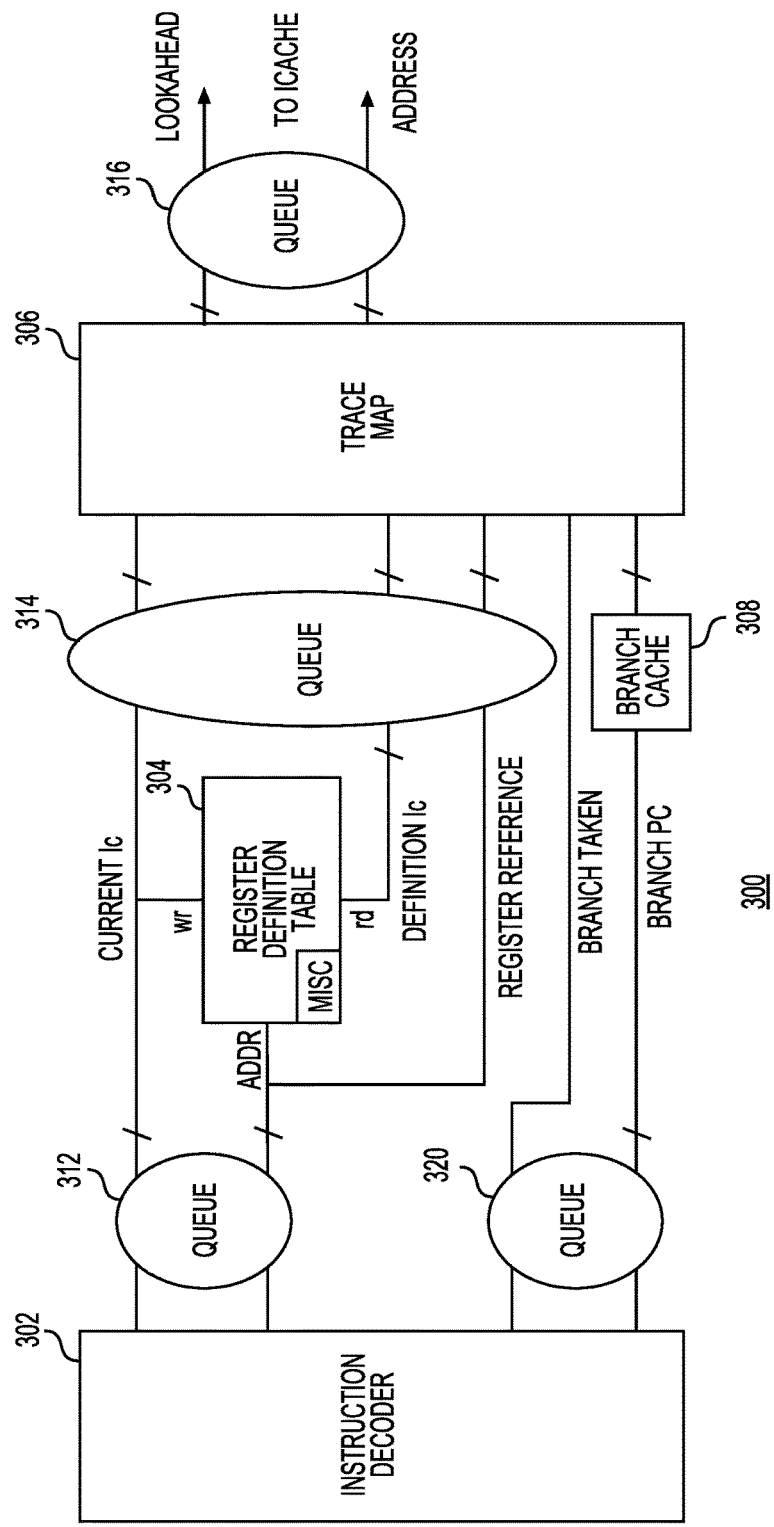
FIG. 3 is a block diagram of the thread annotation logic for a processor in accordance with one example.

FIG. 3 is a block diagram of thread annotation logic 300 for a processor 100 in accordance with one example. For example, thread annotation logic 114 of FIG. 1 may be implemented as thread annotation logic 300 of FIG. 3. FIG. 3 shows an example of a flow of annotation from instruction decoding to the instruction cache update using the lookahead data generated by thread annotation logic 300. Thread annotation logic 300 may include an instruction decoder 302, a register definition table 304, a trace map 306, a branch cache 308, and queues 312, 314, 316, and 320, as shown in FIG. 3. In one example, thread annotation logic 300 may be used to compute the lookahead distance as the number of instructions in the sequence of instructions that separate the current instruction from the most recent register definition on which the current instruction depends and annotate the instruction cache with the result. The registers defined or used by an instruction are manifest when it is decoded, since it is those addresses in the register set that instruction decoding must generate. When an instruction issues, therefore, it will be convenient to find the most recent definition of a register that this instruction (re)defines or uses. This is because the instruction's redefining or reusing the same register thereby creates a dependence. In the current example, register definition table 304 has the most recent definitions of all of a thread's registers. In the current example, this is accomplished by an instruction writing its instance counter (Ic) to register definition table 304 if it defines a register. No change is made to a program executing using processor 100, instead entries in the instruction cache are changed by annotating them with the lookahead distance. Annotation may be performed by adding the lookahead distance as an additional L bits field in each of the instruction cache entries. In this example, instructions are retrieved from the instruction cache for decoding. The instructions that are retrieved may be those which have program counters, for the various threads, pointing to them. An example instruction cache may be instruction cache 104 of FIG. 1. Instruction cache fill operations clear lookahead annotations, and execution within a line may add the lookahead to the instructions within it, increasing the available instruction-level parallelism on subsequent visits by threads.

In this embodiment, once an instruction has been annotated it ceases to be a candidate for further annotation. This is necessary to guarantee annotations describe the shortest lookahead distance as required for correctness. The in-order constraint takes care of the more distant dependences. An exception to this occurs if the trace diverges due to lookahead along both of the paths following a conditional branch. This case could be handled by only overwriting a lookahead value with a smaller one. This complication can be avoided by requiring that all conditional branches be marked either "often" or "seldom" so that the trace never diverges.

With continued reference to FIG. 3, instruction decoder 302 may be the same decoder (e.g., 108 of FIG. 1) that is used to decode instructions as part of the instruction execution process. Using instruction decoder 302 at least the following information may be obtained for each instruction: (1) which registers the instruction defines, if any, (2) which registers the instruction uses, if any, (3) whether or not the instruction is a branch instruction, and (4) whether the instruction stops lookahead. An example register define is writing a register. An example register define may be when an output of an operation by a functional unit is fed to a register. An example register use is reading a register. An example register use may be when a value read from a register is fed to a functional unit for performing an operation on the value. A register reference may be either writing a register or reading a register. A store is a memory definition and a load is a memory use. A memory reference is a load or a store operation. As noted earlier, one goal is to determine the minimum number of instruction issues in program order between a register definition and its closest following use (flow dependence) or redefinition (output dependence). Flow dependence is when an instruction is passing a value via a register or a memory location to another instruction. Output dependence is when an instruction defines a register or a memory location and later another instruction defines the same register or the same memory location. Memory flow and output dependences may be handled using the memory system (not shown) associated with processor 100. Carrying out the dependence analysis for the registers may entail comparing the registers referenced, e.g. used and/or defined by the issuing instruction with those defined by its predecessors along the trace. Moreover, cache annotations will need the program addresses of the trace. The first requirement may be partly satisfied by a register definition table that records the instance counter (Ic) values associated with the most recent definition of each register by prior instructions. The remaining requirements can be satisfied by a trace map that converts the instance counter (Ic) values into instruction addresses.

Figure 4:
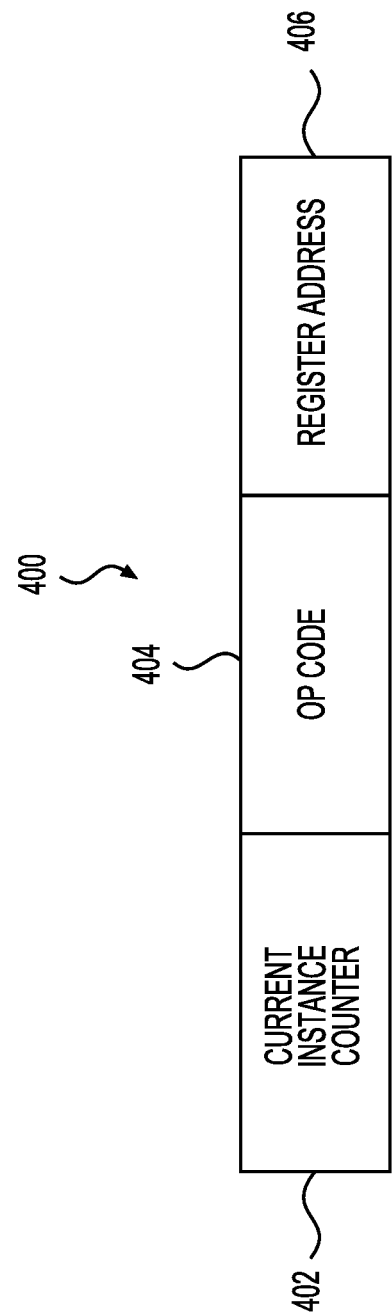
FIG. 4 is a diagram of a register reference descriptor in accordance with one example.

FIG. 4 is a diagram of a register reference descriptor 400 in accordance with one example based on the ARMv8 instruction set. In this example, each time an instruction is decoded using instruction decoder 302, between one and four register reference descriptors 400 may be generated and stored as part of register definition table 304 of FIG. 3. Register reference descriptor 400 may include three fields: a current instance counter (Ic) 402, opcode 404, register address 406. In this, each register reference descriptor 400 may be 12-bits wide and the current instance counter 402 may be 4-bits wide. Opcode 404 may be 3-bits wide. Register address 406 may be 5-bits wide. Current instance counter 402 may have the value that comes from instance counter 204 of instruction issue logic 200 of FIG. 2. Opcode 404 defines the various possibilities for register definitions or uses, as further shown below in Table 3. Register address 406 provides the register address information, for example, the register name.

Table 3 below shows the example values for the opcode, register operation, and register address fields, in accordance with one example. As an example, the first row shows that opcode 0 may correspond to a register definition operation and the register address may be the G register.

| Opcode | Register Operation | Register Address |
|---|---|---|
| 0 | G def | G register |
| 1 | F def | F register |
| 2 | G def and stop lookahead | G register |
| 3 | F def and stop lookahead | F register |
| 4 | G use | G register |
| 5 | F use | F register |
| 6 | — | — |
| 7 | (see register name field) | Cflag, Acquire def/use, stop lookahead, branch taken, etc. |

The register definition table 304 remembers one instance counter (Ic) value for each register. Taking ARMv8 architecture as an example, there are 64 main architectural registers in ARM64: 32 general registers (G registers) prefixed by W or X and 32 floating point/SIMD registers (F registers) prefixed by S, D, B, H, or Q. In addition, instance counters for the acquire use/def and the conditional flags (e.g., the information in the last row of Table 3) need to be stored, as well. In this example, to handle the 64 registers and the information in the last row of Table 3, register definition table 304 may be implemented as a 66 by 4 bit memory that includes a 5-bit instance counter (Ic) value for each register reference. Register definition table 304 is read for each register reference and updated if the register reference was a register definition. Other mutable architectural states can either be treated as a kind of register (e.g. the condition flags CF) or can be made to terminate lookahead (by requiring summary counter (Sc)=0) when that state is potentially used or redefined by an instruction. Floating point flags are a special case; they may only require termination of lookahead when they are explicitly read. Extra four bit registers may keep track of condition flag definitions and acquire operations.

With continued reference to Table 3, the acquire def/use bits in the last row of Table 3 may be used to ensure release consistency. This relates to enforcing cross-thread dependences, where one thread may need to release a memory location before another thread could acquire it, thereby getting permission to proceed from the first thread. As an example, thread A may write a memory location that it wants thread B to read, and both threads may need to perform synchronization operations. As an example, thread A may unlock a lock and thread B may then lock the same lock. In another example, thread A may perform a V-type operation (e.g., an output synchronization operation) and thread B may perform a P-type operation (e.g., an input synchronization operation). This enforces dependence in terms of the order of the operations. All preceding memory references must be completed (e.g., be globally visible) before a release operation may issue because any of them may carry a dependence. To enforce this possible dependence, all of the instructions prior to the V-type operation (the release) must be performed prior to the release. Similarly, all of the instructions following the P-type operation (the acquire) must not begin until after the acquire has been performed. Release may be enforced by making all preceding memory references lookahead predecessors of the release operation; another way is simply to make releases stop lookahead. Acquires may be enforced by making each acquire a lookahead predecessor of its closest following memory reference. In this sense, an "acquire bit" may act as a "register definition," such that thread annotation logic 300 may identify acquires and releases. Thus, in this example, memory references reference or use the acquire bit and the instruction that performs the acquire defines it.

In one example, the maximum number of register definitions by a non-SIMD ARMv8 instruction may be three, and the maximum number of references may be four. As the number of register definitions per instruction may vary, queues 312, 314, 316, and 320 may be used to buffer signals, as needed, to ensure proper operation. In one example, the only instructions with three definitions may be variants of the load pair instruction that define two G or two F registers from a pre-indexed memory address or a post-indexed memory address in a third G register. These load pair instructions may be used to restore register state from the stack or elsewhere. Instructions with four references may include many instructions that reference the condition flags, e.g. add with carry (ADC), and a variety of multiply-add instructions.

In the ARMv8 example, a trace map records register definitions for each value of the instance counter. In this example, the trace map may record register definitions for up to sixteen possible instance counter values. As shown in FIG. 3, for this example, thread annotation logic 300 reads register definition table 304 to generate a definition instance counter (Ic). The current instance counter (Ic), the definition Ic, and the register reference (define or use) are provided to the trace map. The definition Ic acts as an index to the trace map. To avoid the need to erase register definition table entries that survive "wrapping" by the current instance counter (Ic), the entries are allowed to survive and the trace map handles any false positives that result. In other words, in this example, the register definition table points to the most recent definition in the trace if it still exists.

The trace map remembers the registers that were defined by each instruction in the trace. In one example, this may take 17 bits: up to three five-bit register names and a two-bit opcode that helps interpret them. Table 4 below shows nominal values for the opcode, register operation, and register address fields, in accordance with the example. The first row shows that opcode 0 corresponds to a load register G pair operation and the three register addresses denote the defined G registers.

| Opcode | Operation | Register 2 | Register 1 | Register 0 |
|---|---|---|---|---|
| 0 | Load G pair, indexed | G register | G register | G register |
| 1 | Load F pair, indexed | F register | G register | F register |
| 2 | See Register 2 field | Reg 1 G/F/—, Reg 0 G/F/—, Cflags | G/F/— register | G/F/— register |
| 3 | Dead | — | — | — |

One example of the trace map encoding may also represent a dead condition (e.g., the last row of Table 4 above) that prevents re-annotation of the same instruction. When an instruction reference item accesses the trace map at a position based on the instance counter (Ic) derived from register definition table 304 and the entry is dead, no further action is required. Otherwise, the register names are compared with the reference item from the current instruction. If there is no match, the relevant register definition table entry has outlived the trace map entry it targeted and again no further action is needed. If there is a match it will indicate that there is a dependence. In that case, the trace map is used to calculate the program address for the instruction and put it in a queue (e.g., queue 316 of FIG. 3) with the lookahead value, i.e., the current instance counter (Ic) minus the definition instance counter (Ic) minus 1 (modulo 16), for annotating the instruction cache. In this example, the instruction address is computed by adding the 4-bit offset stored in branch cache 308 to the branch cache entry addressed by the two bit Branch pc field (shown in FIG. 3). Once the instruction cache has been annotated once at a particular entry for an instruction address, using thread annotation logic 300, the entry is marked dead to prevent further annotation at this instruction address. In the current example, the instructions in the instruction cache and the lookahead values annotated using thread annotation logic 300 may be indexed by the same index. In other words, the lookahead distance values are stored in a separate memory (e.g., a lookahead cache) from the instruction cache. If there is an instruction cache miss during the annotation process, then thread annotation logic 300 may ignore the cache miss. In one example, if an annotated instruction cache entry is evicted from the instruction cache (e.g., a L1 cache), it may be backed to a higher level cache, for example an L2 cache.

To ensure that the lookahead value will always be as large as possible, a lookahead-terminating instruction may annotate all of its unannotated predecessors in the trace map with a suitable value such as that described above. This iterative process may be accomplished by letting the trace map process the lookahead termination reference item for 16 cycles, starting with a trace instance counter (Ic) of one more than the current instance counter (Ic) and incrementing it as it visits and updates the trace entries until it again equals the current instance counter (Ic).

In one example, the trace map may represent a program address using seven bits, a two bit base name and a five-bit offset. The base name may index a small separate base cache (e.g., branch cache 308 of FIG. 3) that maintains the most recent program addresses generated by branches or by offset overflow. This cache may be updated associatively to re-use duplicate entries generated by loops. In one example, every time a branch is taken, a new base name and offset may be stored in branch cache 308. In addition, in one example, if an offset reaches 31 without taking a branch, a new branch program counter is inserted just as if a forward branch of 32 instructions had occurred. As an example, in the ARMv6 architecture, with an instruction size of four bytes, the program address may be computed by obtaining the bits indexed by the base name, adding the offset to it, and multiplying the sum by four. Branch program addresses may be fed to a queue separately by instruction execution and consumed by the trace map if a "branch taken" is seen among the reference items. If the offset overflows, thread annotation logic 300 may simulate a branch to a higher program address. In one example, before the base cache can reuse a base name, all non-dead trace map entries that refer to the name must be marked dead by an iterative process in order to avoid mis-annotation using the wrong base.

Once all annotations due to current instruction references are complete, annotation of the program address mapped by the current instruction's instance counter (Ic) is forced if necessary (i.e., if it is not already dead) with the maximum lookahead value of $2^L-1$. Then a new base and offset may be computed for the current instruction and stored in the trace map at the current instance counter (Ic), updating the base cache if necessary. The new register definitions may also be written and the dead condition may be cleared to make the new trace map entry available to subsequent instructions.

Figure 5:
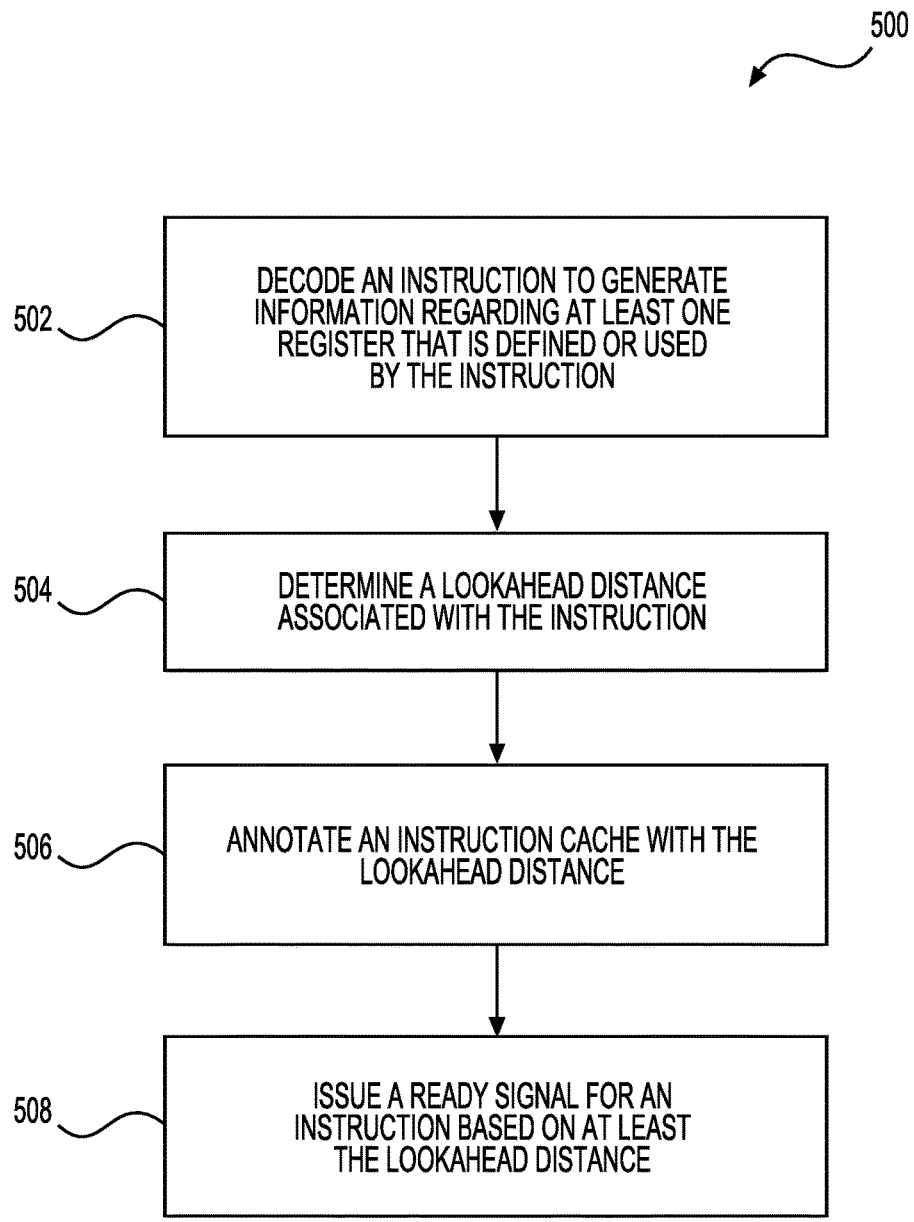
FIG. 5 is a flow diagram of a method in accordance with one example.

FIG. 5 is a flow diagram 500 of a method in accordance with one example. In step 502, an instruction decoder (e.g., instruction decoder 302 of FIG. 3) may decode an instruction to generate information regarding at least one register that is defined or used by the instruction. Using instruction decoder 302 at least the following information may be obtained for each instruction: (1) which registers the instruction defines, if any, and (2) which registers the instruction uses, if any. As part of this step, instruction decoder 302 may obtain additional information regarding the instruction, including (1) whether or not the instruction is a branch instruction, and (2) whether the instruction stops lookahead. An example register define is writing a register. An example register define may be when an output of an operation by a functional unit is fed to a register. An example register use is reading a register. An example register use may be when a value read from a register is fed to a functional unit for performing an operation on the value. A register reference is either writing a register or reading a register. A store is a memory definition and a load is a memory use. A memory reference is a load or a store operation.

In step 504, logic (e.g., thread annotation logic 300 of FIG. 3) may determine a lookahead distance associated with the instruction. In one example, logic may be used to compute the lookahead distance as the number of instructions in a set of instructions that separate the current instruction from the most recent register definition on which the current instruction depends and annotate the instruction cache with the result. When an instruction issues, it needs to generate an annotation for the instruction. The instruction needs to find the most recent definition of a register that this instruction defines or uses. This is because the instruction may be redefining or reusing the same register thereby creating a register dependence. In one example, register definition table 304 has the most recent definitions or uses of registers. In one example, this is accomplished by an instruction writing its instance counter (Ic) to register definition table 304 if it defines a register.

In step 506, logic (e.g., thread annotation logic 300 of FIG. 3) may annotate an instruction cache (e.g., instruction cache 104 of FIG. 1) with the lookahead distance. No change is made to a program executing using processor 100, instead entries in the instruction cache are changed by annotating them with the lookahead distance. Annotation is performed by adding the lookahead distance as an additional L bits field to each of the instruction cache entries.

In step 508, logic (e.g., ready signal generator 210 of FIG. 2), may issue a ready signal for an instruction based on at least the lookahead distance. In one example, the ready signal may be based on the status of the dependence counter for the instruction and the presence or absence of a stop lookahead signal, as discussed earlier. Thus, a ready signal for an instruction instance may be issued when the corresponding dependence counter value is zero and the stop lookahead signal is not asserted (e.g., it has a logic 0 value).

In conclusion, a processor having an instruction cache for storing a plurality of instructions is described. The processor may further include annotation logic configured to determine a lookahead distance associated with an instruction and annotate the at least one instruction cache with the lookahead distance. The processor may further include instruction issue logic configured to issue a ready signal for an instruction based on the lookahead distance. The lookahead distance may correspond to a number of instructions that separate the instruction from a most recent architectural state definition and the architectural state definition may include a register definition. The processor may further include at least one instruction decoder configured to decode the instruction and generate information regarding at least one register that is defined or used by the instruction. The processor may further include instruction issue logic configured to generate a plurality of descriptors comprising information regarding each register that is defined or used by the instruction. The annotation logic may be further configured to manage a trace map for a plurality of instructions, where the trace map is configured to keep track of any registers that are defined by any of the plurality of instructions. The trace map is further configured to encode values that allow recovery of addresses of any of the plurality of instructions that define at least one register. The annotation logic may be further configured to manage a register definition table for a plurality of instructions, where the register definition table is configured to record an instance counter value associated with a most recent definition of a set of registers by any of the plurality of instructions.

In another aspect, a processor having an instruction cache for storing a plurality of instructions is described. The processor may further include annotation logic configured to determine a lookahead distance associated with an instruction and annotate the at least one instruction cache with the lookahead distance. The processor may further include instruction issue logic configured to issue a ready signal for the instruction based on at least the lookahead distance for the instruction, where the lookahead distance provides a measure of register dependence. The measure of the register dependence corresponds to a number of instructions in a sequence of instructions that separates the instruction that defines a register from a next instruction that references the register. The processor may further include instruction issue logic configured to generate a descriptor comprising information regarding each register that is defined or used by the instruction. The annotation logic may be further configured to manage a trace map for a plurality of instructions, where the trace map is configured to keep track of any registers that are defined by any of the plurality of instructions. The trace map is further configured to encode values that allow recovery of addresses of any of the plurality of instructions that define at least one register. The trace map is further configured to encode a value that permits annotation of the at least one instruction cache. The annotation logic may be further configured to manage a register definition table for a plurality of instructions, where the register definition table is configured to record an instance counter value associated with a most recent definition of a set of registers by any of the plurality of instruction.

In yet another aspect, a method in a processor comprising an instruction cache for storing a plurality of instructions and annotation logic is described. The method may include using the annotation logic determining a lookahead distance associated with an instruction and annotating the at least one instruction cache with the lookahead distance. The lookahead distance may correspond to a number of instructions in a set of instructions that separate the instruction from a most recent register definition that the instruction uses or defines. The method may further include decoding the instruction and generating information regarding at least one register that is defined or used by the instruction. The method may further include issuing a ready signal for an instruction based on the lookahead distance. The lookahead distance provides a measure of register dependence.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., instruction cache 104 or other types of non-transitory media. The term "non-transitory media" as used herein refers to any media storing data and/or instructions that cause a machine, such as processor 100, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A processor comprising:
an instruction cache for storing a plurality of instructions; and
annotation logic configured to determine a lookahead distance associated with an instruction and annotate the at least one instruction cache with the lookahead distance.

2. The processor of claim 1 further comprising instruction issue logic configured to issue a ready signal for an instruction based on the lookahead distance.

3. The processor of claim 1, wherein the lookahead distance corresponds to a number of instructions that separate the instruction from a most recent architectural state definition.

4. The processor of claim 3, wherein the architectural state definition comprises a register definition.

5. The processor of claim 1 further comprising at least one instruction decoder configured to decode the instruction and generate information regarding at least one register that is defined or used by the instruction.

6. The processor of claim 5 further comprising instruction issue logic configured to generate a plurality of descriptors comprising information regarding each register that is defined or used by the instruction.

7. The processor of claim 1, wherein the annotation logic is further configured to manage a trace map for a plurality of instructions, wherein the trace map is configured to keep track of any registers that are defined by any of the plurality of instructions.

8. The processor of claim 7, wherein the trace map is further configured to encode values that allow recovery of addresses of any of the plurality of instructions that define at least one register.

9. The processor of claim 1, wherein the annotation logic is configured to manage a register definition table for a plurality of instructions, wherein the register definition table is configured to record an instance counter value associated with a most recent definition of a set of registers by any of the plurality of instructions.

10. A processor comprising:
an instruction cache for storing a plurality of instructions;
annotation logic configured to determine a lookahead distance associated with an instruction and annotate the at least one instruction cache with the lookahead distance; and
instruction issue logic configured to issue a ready signal for the instruction based on at least the lookahead distance for the instruction, wherein the lookahead distance provides a measure of register dependence.

11. The processor of claim 10, wherein the measure of the register dependence corresponds to a number of instructions in a sequence of instructions that separates the instruction that defines a register from a next instruction that references the register.

12. The processor of claim 10 further comprising instruction issue logic configured to generate a descriptor comprising information regarding each register that is defined or used by the instruction.

13. The processor of claim 10, wherein the annotation logic is further configured to manage a trace map for a plurality of instructions, wherein the trace map is configured to keep track of any registers that are defined by any of the plurality of instructions.

14. The processor of claim 13, wherein the trace map is further configured to encode a value that permits annotation of the at least one instruction cache.

15. The processor of claim 10, wherein the annotation logic is configured to manage a register definition table for a plurality of instructions, wherein the register definition table is configured to record an instance counter value associated with a most recent definition of a set of registers by the plurality of instructions.

16. A method in a processor comprising an instruction cache for storing a plurality of instructions and annotation logic, the method comprising:
  using the annotation logic determining a lookahead distance associated with an instruction and annotating the at least one instruction cache with the lookahead distance.

17. The method of claim 16, wherein the lookahead distance corresponds to a number of instructions in a set of instructions that separate the instruction from a most recent register definition that the instruction uses or defines.

18. The method of claim 16 further comprising decoding the instruction and generating information regarding at least one register that is defined or used by the instruction.

19. The method of claim 16 further comprising issuing a ready signal for an instruction based on the lookahead distance.

20. The method of claim 16, wherein the lookahead distance provides a measure of register dependence.

* * * * *